United States Patent [19]
Nelson

[11] Patent Number: 6,054,046
[45] Date of Patent: Apr. 25, 2000

[54] SYSTEM FOR RE-CIRCULATING A GAS MIXTURE TO TREAT LIQUIDS

[76] Inventor: William R. Nelson, 22029 54th Ave. W., Mountlake Terrace, Wash. 98043

[21] Appl. No.: 09/071,249

[22] Filed: May 1, 1998

Related U.S. Application Data

[63] Continuation-in-part of application No. 08/832,386, Apr. 2, 1997, Pat. No. 5,865,995.

[51] Int. Cl.$^7$ ................................................. B01D 19/00
[52] U.S. Cl. ........................... 210/194; 210/205; 210/206; 210/218; 55/237; 96/181; 96/216; 261/79.2; 261/DIG. 42; 261/DIG. 75
[58] Field of Search ..................................... 210/192, 194, 210/205, 206, 218; 96/181, 216; 55/237; 261/79.2, DIG. 42, DIG. 75

[56] References Cited

U.S. PATENT DOCUMENTS

| | | | |
|---|---|---|---|
| 3,581,467 | 6/1971 | Donnelly | 261/79.2 |
| 3,771,288 | 11/1973 | Wisman et al. | 55/204 |
| 3,771,290 | 11/1973 | Stethem | 55/205 |
| 4,259,267 | 3/1981 | Wang | 261/DIG. 75 |
| 4,834,343 | 5/1989 | Boyes | 261/DIG. 75 |
| 5,203,891 | 4/1993 | Lema | 55/205 |
| 5,283,048 | 2/1994 | Martin et al. | 55/237 |
| 5,514,267 | 5/1996 | Machiya et al. | 261/DIG. 42 |
| 5,622,545 | 4/1997 | Mazzei et al. | 96/216 |

Primary Examiner—David A. Simmons
Assistant Examiner—Betsey J. Morrison
Attorney, Agent, or Firm—Delbert J. Barnard

[57] ABSTRACT

A gas treatment system for liquids can increase gas exposure and contact time. A liquid stream is directed into a vortex chamber (130). The vortex chamber (130) creates a downward spiral flow of the liquid stream forcing it into an upper end inlet (145) of a contact tank (114) and downward in the contact tank (114). When the liquid stream reaches a lower region (170) of the contact tank (114), a portion is drawn into a draw tube (120) while the other portion is drawn into a re-circulation system (160). In the re-circulation system (160), a gas injector system (166) entrains bubbles of a treatment gas into the liquid stream creating a re-circulated stream that is displaced into an upper region (168) in the contact tank (114). The portion drawn into the draw tube (120) then moves upwardly to a degassing chamber (146) wherein the treatment gas is separated from the liquid and delivered through an outlet (124) for use. Because the entrained bubbles are forced downwardly through the contact tank (114), and a portion of the liquid stream is re-circulated with additional entrained bubbles, the gas bubbles remain quite small and contact time is prolonged. Release of the treatment gas is further facilitated by positioning the degassing chamber (146) at an elevated position which promotes gas bubble expansion, combination and release.

20 Claims, 3 Drawing Sheets

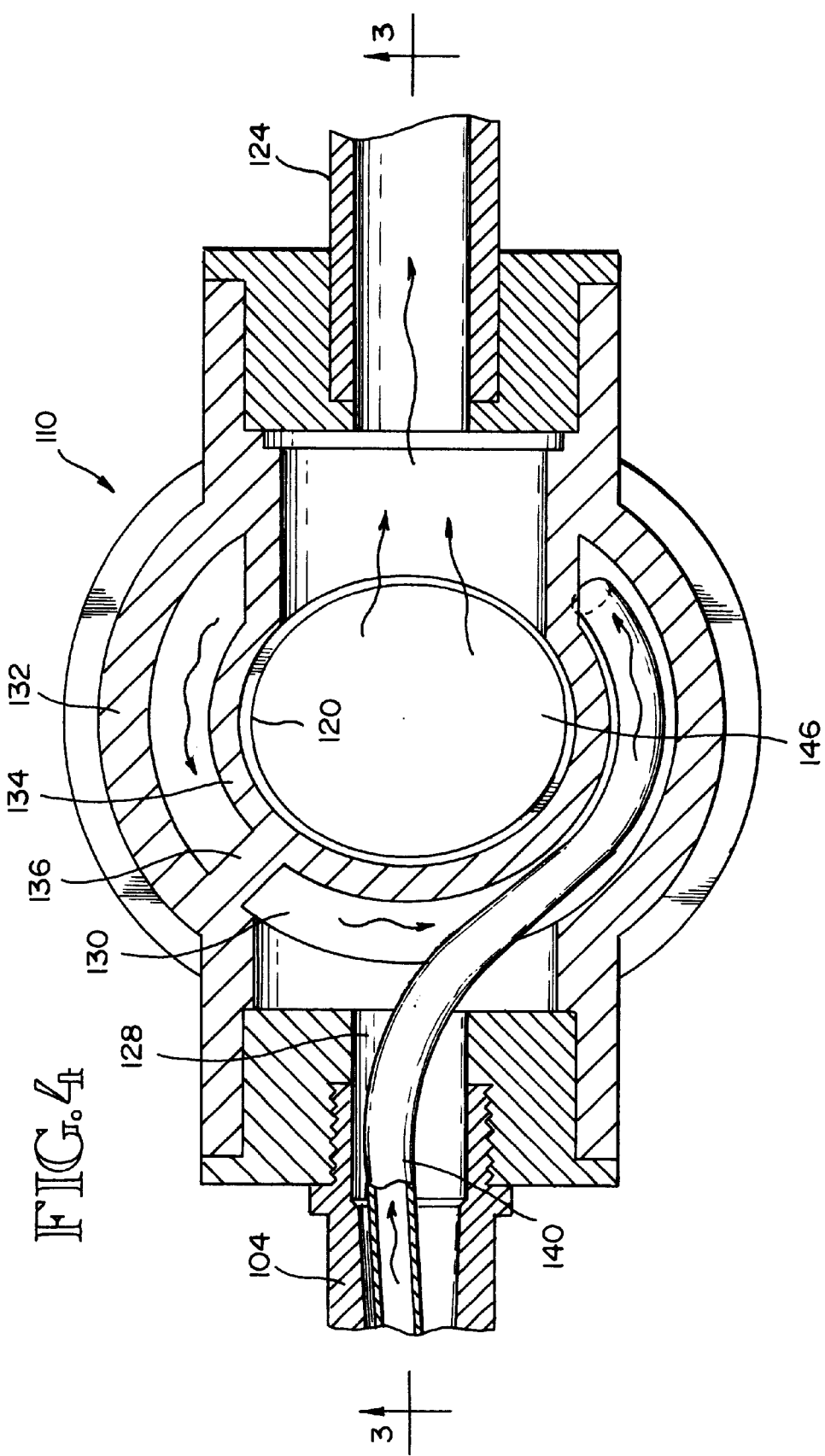

SYSTEM FOR RE-CIRCULATING A GAS MIXTURE TO TREAT LIQUIDS

RELATED APPLICATION

This is a continuation-in-part of my application, Ser. No. 08/832,386, filed Apr. 2, 1997, now U.S. Pat. No. 5,865,995, issued Feb. 2, 1999, and entitled, "System for Treating Liquids with a Gas."

TECHNICAL FIELD

This invention relates to systems for combining a mixture of gas, such as ozone, with a liquid, such as water, for the purpose of treating that liquid and then removing at least some of the gas from the liquid prior to use. This invention provides increased exposure and contact time of the treating gas to the treated liquid.

BACKGROUND OF THE INVENTION

Water contamination can be both naturally occurring or caused by man. Naturally-occurring substances like radon, carbon dioxide, and hydrogen sulfide, as well as heavy mineral content, including iron, calcium and manganese, can make water completely unusable or even toxic to some life forms. Reverse osmosis and other membrane filters are often too costly or too complicated for broad-based application. Injection of ozone, air, oxygen and other gases into water streams for disinfection, oxidation and gas stripping have been effectively used.

In order for gas injection to be effective at removing contaminants and/or killing bacteria, the gas must come into physical contact with as much of the water as possible and remain in contact for as long as possible. Typically, the treatment gas is bubbled through the liquid or injected, such as by a venturi. After exposure and contact, the gas is removed prior to use of the liquid.

Prior art systems usually attempt to maximize gas contact by increasing the amount of gas injected into the liquid. This is often insufficient because contact decreases as small bubbles combine into larger bubbles and is effectively terminated once those bubbles reach the top of a mixing vessel or chamber. It is difficult to control contact time other than to make the contact chamber taller, thereby increasing the amount of time it takes for bubbles to gravitate to the top.

SUMMARY OF THE INVENTION

The present invention provides an improvement over the prior art in that a liquid stream is introduced into a vortex chamber, creating a downward spiral flow of the liquid stream. This stream is forced into an upper end inlet of a contact tank and downward in the contact tank. When the liquid stream reaches a lower region of the contact tank, a portion is drawn into a draw tube while the other portion is drawn into a re-circulation system. In the re-circulation system, a gas injector system entrains bubbles of a treatment gas into the liquid stream creating a re-circulated stream that is displaced into an upper region of the contact tank. The portion drawn into the draw tube then moves upwardly to a degassing chamber where in the treatment gas is separated from the liquid and delivered through an outlet for use.

The degassing system may include a detector that detects a desired flow of the liquid stream flowing through the inlet and controls the operation of the re-circulation system. The vortex chamber and degassing chamber may be concentrically constructed such that the vortex chamber comprises an annular space positioned radially outwardly of the degassing chamber. In such an embodiment, the outlet of the contact tank would comprise a draw tube having an opening adjacent the lower end of the tank and extending upwardly within the tank to the degassing chamber. Preferably, the re-circulation system remains in operation for a predetermined delay period after the detector has detected an insufficient flow through the water inlet. This delay period allows the liquid in the contact chamber to maintain its ozone concentration.

The degassing chamber may include a region of increased volume into which the liquid stream is delivered from the tank outlet, thereby providing a region of decreased pressure for facilitating removal of the treatment gas from the liquid. The treatment gas may be vented from the degassing chamber to the atmosphere or collected for disposal.

The present invention may be beneficial in applications that use ozonated water intermittently, such as produce, poultry, or fish displays or for other uses in which ozonated water is needed in a timely manner,. Because the entrained bubbles are forced downwardly through the contact tank and then a portion of the liquid stream is re-circulated with additional entrained bubbles, the gas bubbles remain quite small and the contact time is prolonged. A significant head pressure or back pressure on the system causes the bubbles to decrease in size as they are forced downwardly through the tank. As the liquid stream is drawn upwardly to the degassing chamber, the bubbles expand and combine for release from the liquid.

The present invention increases both gas exposure to the liquid and contact time between the liquid and treatment gas. Many other advantages and attributes of the invention will be noted by an examination of the following description of the inventor's best mode for carrying out the invention, the claims and appended figures of the drawing, all of which make up part of the disclosure of the present invention.

BRIEF DESCRIPTION OF THE DRAWINGS

Like reference numerals are used to indicate like parts throughout the various figures of the drawing, wherein:

FIG. 4 is a sectional view taken substantially along line 4—4 of FIG. 3.

BEST MODE FOR CARRYING OUT THE INVENTION

Figure 1:
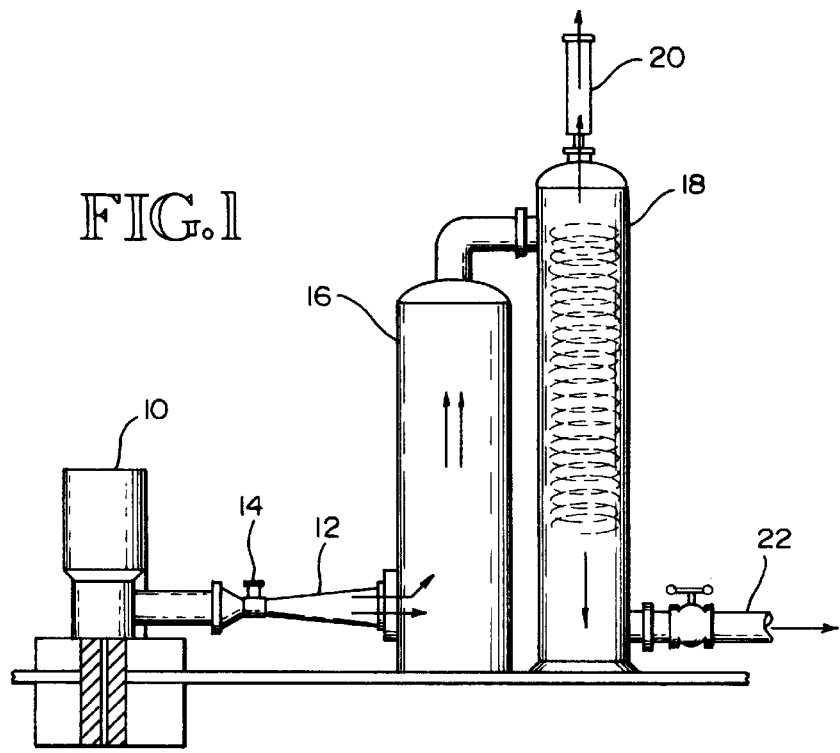
FIG. 1 is a schematic representation of a prior art water treatment system.

Referring to the various figures of the drawing, and first to FIG. 1, therein is shown a schematic representation of a prior art system for treating liquids with injected gases. A pump 10 draws a liquid, such as water from a well, and delivers it under pressure to a venturi-type injector 12. Treatment gas, such as air or ozone, is drawn into the venturi intake 14 and is mixed with the liquid in a turbulent whirl of bubbles. The gas and liquid then enter a reactor vessel 16. Due to the sudden increase in volume, the turbulence is sharply decreased and the surface tension of gas bubbles causes them to want to combine into larger bubbles. The increased volume of the chamber may also decrease the pressure of the liquid and gas if sufficient back pressure is not maintained. As the bubbles rise, the head pressure created by the liquid decreases and individual bubbles expand. This increase in size of individual bubbles increases the likelihood of bubble collision and combination. The liquid is then de-gassed in a separator 18. The captured entrained gases are released through a relief valve 20 at the top of the separator 18. The treated fluid is then delivered for use through an outlet 22 at the bottom end of the separator 18. A separator 18 of this type is shown, for example, in U.S. Pat. No. 5,338,341, issued Aug. 16, 1994, to Angelo L. Mazzei and Steven D. Ford. A system of the type described above is sold by GDT Corporation, an alliance of Mazzei Injector Corporation and Claude Laval Corporation, of Phoenix, Ariz.

The present invention improves on the prior art by substantially increasing both the amount of contact between entrained gases and the liquid being treated and the amount of contact time. Accordingly, the required amount of treatment gas, such as ozone, may be substantially reduced.

Figure 2:
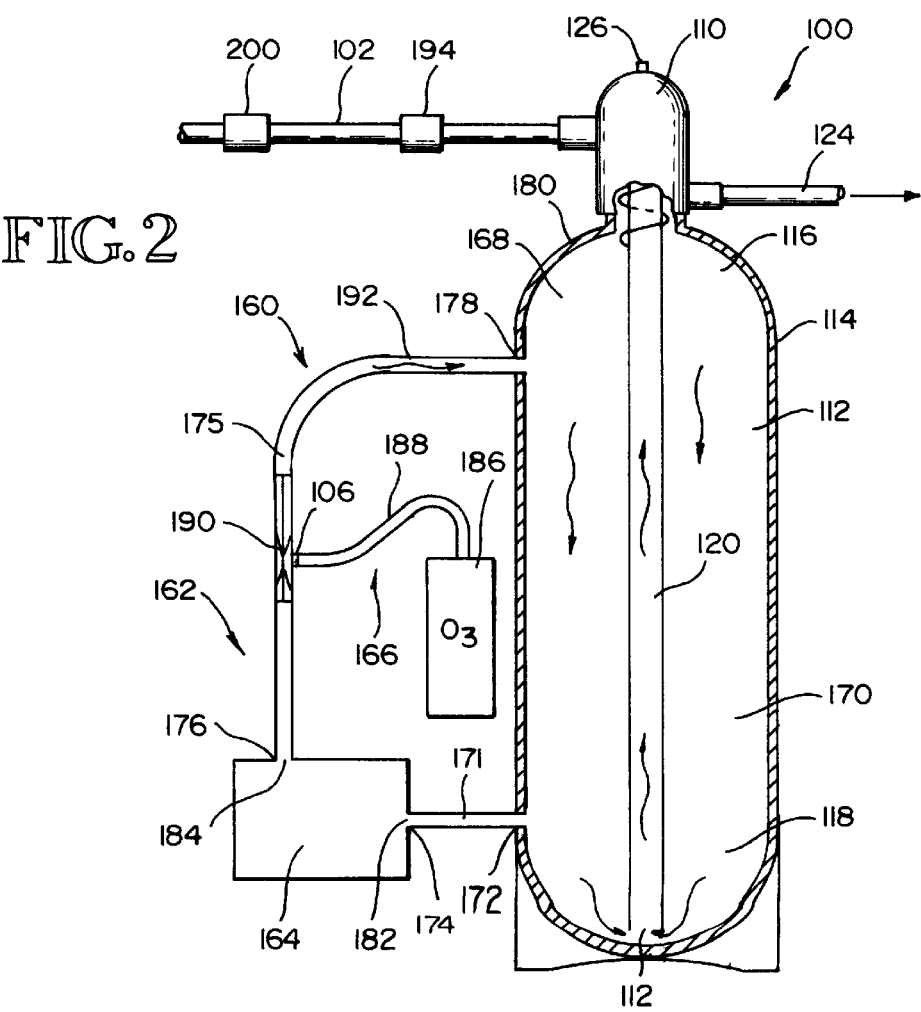
FIG. 2 is a partially cut-away side view of a water treatment system according to the present invention.

A preferred embodiment of the present invention is shown schematically in FIG. 2. This system was specifically designed for ozone ($O_3$) treatment of water for disinfection and removal of undesired minerals. The system 100 includes a water inlet 102 that delivers the water to the vortex chamber. This vortex chamber is not shown in FIG. 2, but will be explained in greater detail below. The vortex chamber is within a housing 110 that is especially designed or adapted according to the present invention.

A whirling motion is created within the vortex chamber causing a downward spiral flow of the liquid stream into a contact chamber 112 housed by an elongated tank 114. In preferred form, the tank 114 is cylindrical in cross-section with rounded ends. Common tanks of this type are available inexpensively made from polypropylene or polyurethane and reinforced exteriorly by wound glass fiber. Such tanks are available in common 6–12 in. diameters and in any desired length, such as 48 in. to 72 in.

Treatment gas such as ozone is introduced into the liquid stream by the re-circulation system 160. The re-circulation system includes a re-circulation conduit 162, a booster pump 164, and a gas injector system 166. The re-circulation conduit 162 includes an inlet portion 171 and an outlet portion 175. A first end 172 of the inlet portion 171 extends horizontally outwardly through a sidewall 180 from a lower region 170 of the tank 114. A second end 174 of the inlet portion 171 is operably connected to the pump inlet 182. The outlet portion 175 has a first end 176 operably connected to a pump outlet 184 and a second end 178 connected through sidewall 180 to an upper region 168 of the tank 114.

The gas injector system 166 includes a gas or ozone generator 186, a gas supply line 188, and a gas injector 190. The gas injector 190 is located between the first and second end 176, 178 of the outlet portion 175. A preferred gas injector is manufactured by Mazzei Injector Corporation of Bakersfield, Calif. Ideally, the injector is made of PEVDF (Kynar®) that is resistant to degradation by ozone gas. The suction port 106 is attached to a source of treatment gas, such as the ozone generator 186, through the gas supply line 188.

Because the injector 190 can result in a substantial pressure drop (often as much as 20 psi), the water being supplied to the re-circulation conduit 162 must be pressurized beyond the desired delivery pressure. This can be accomplished simply by using an appropriate pump, such as the booster pump 164. The booster pump 164 draws the liquid stream from the lower region 170 of the contact chamber 112 into the re-circulation conduit 162 where the gas injector system 166 entrains bubbles of a treatment gas into the liquid stream thereby creating a re-circulation mixture 192 which the booster pump 164 displaces through the re-circulation conduit 162 to the upper region 168 of the tank 114. The exact nature of the re-circulating pump is not critical to the invention.

The re-circulation system 160 is controlled by a detector or flow switch 194 of any well-known type operably positioned in the water inlet 102. The detector 194 detects a predetermined desired flow which signals that water is being drawn from an outlet 124. The detector 194 has electrical connections (not shown) to the booster pump 164 and the gas generator 186.

The re-circulation mixture 192 is forced downwardly along with the liquid stream in the contact chamber 112. This is in contrast to many prior art systems that introduce the gas at the bottom end of a reactor vessel and then allow the bubbles to migrate upward. As the microscopic bubbles are forced downward in a virtual cloud of entrained gas, they are compressed by the head pressure of the water in the tank 114. This pressure can be substantial, adding 0.03613 psi of head pressure per inch of water depth.

While the detector 194 detects a desired water flow through the water inlet 102, the pump 164 and ozone generator 186 remain in operation. Preferably, the pump 164 and ozone generator 186 remain in operation for a predetermined delay period after the detector 194 has detected an insufficient flow through the water inlet 102. This delay allows the liquid in the contact chamber 112 to maintain its ozone concentration which is beneficial in applications that use ozonated water intermittently, such as produce, poultry, or fish displays. For these types of applications, a delay period of approximately 90 seconds is appropriate. However, even if the system 100 is run continuously, the present invention maintains a level of concentrated ozone on output, preferably about 0.5% ozone in solution by weight. A preferred detector is manufactured by Gems Sensors Inc. of Plainville, Conn.

As the microscopic entrained bubbles are forced downwardly by incoming water and/or bubbles, their diminishing size and increasing pressure offset the tendency of surface tension to cause the bubbles to combine. Combined, and therefore larger, bubbles are not desirable because they result in less contact area between water and ozone gas. A rounded shape at the upper end 116 of the tank 114 will cause any combined, larger bubbles to migrate toward the center where a swirling, turbulent vortex of water and entrained bubbles are being forced downwardly into the tank 114. This vortex force will tend to break apart larger bubbles into a size small enough that they can be forced downwardly in the chamber 112.

As the water and entrained bubbles reach the lower region 170 of the chamber 112, a portion of the mixture is drawn into a draw tube 120 that has an opening 122 at its bottom end while the other portion is drawn into the re-circulation system 160. By having a portion re-circulate through the re-circulation system 160, a higher concentration of ozone may be achieved without substantially increasing the amount of ozone generated by the ozone generator 186. This higher concentration of ozone increases the exposure and contact time with the water. It also allows the contact chamber 112 to be shorter than if the gas was entrained before entry into the contact chamber or entrained near the bottom of the contact chamber. An advantage achieved from using a shorter contact chamber is that the system 100 may be enclosed in a housing which could then be mounted on the wall. In preferred form, the lower end 118 of the tank 114 is also rounded so that the opening 122 of the draw tube 120 is adjacent the lowest point in the tank 114.

In some situations, flocculation of contaminants, such as iron, will occur in the chamber 112 due to reaction with the ozone or other treatment gas. The rounded bottom shape of the tank 114 prevents buildup of any such flocculent or precipitant, causing the solids to move by gravity to the center of the tank 114 and to be drawn into the opening 122 of the draw tube 120. If desired, a filter or screen can be added at the opening 122 to catch these materials before they continue on through the water delivery system. Also, other conventional barrier filters may be installed at a later point in the system for removal of precipitated solids.

After the treated water with entrained gas bubbles enters the draw tube 120, the bubbles will rapidly ascend due to their differential and specific gravity, as well as due to the flow of water. As the bubbles rise, head pressure decreases and the bubbles expand. The expanding bubbles come into closer contact with one another, causing them to combine as they ascend. As the bubbles reach the upper chamber 110, the disinfection and decontamination effect is complete and separation of the gas from the water (also known as "off-gassing" or "de-gassing") is achieved before the water is delivered through an outlet 124 for eventual use.

In preferred form, off-gassing is achieved by delivering the flow of water and bubbles into a chamber of increased volume, causing rapid depressurization and release of entrained gases. The gas may be released to the atmosphere or otherwise through a relief valve 126. In preferred form, the outlet port 124 is at a lower end of the de-gassing chamber.

Figure 3:
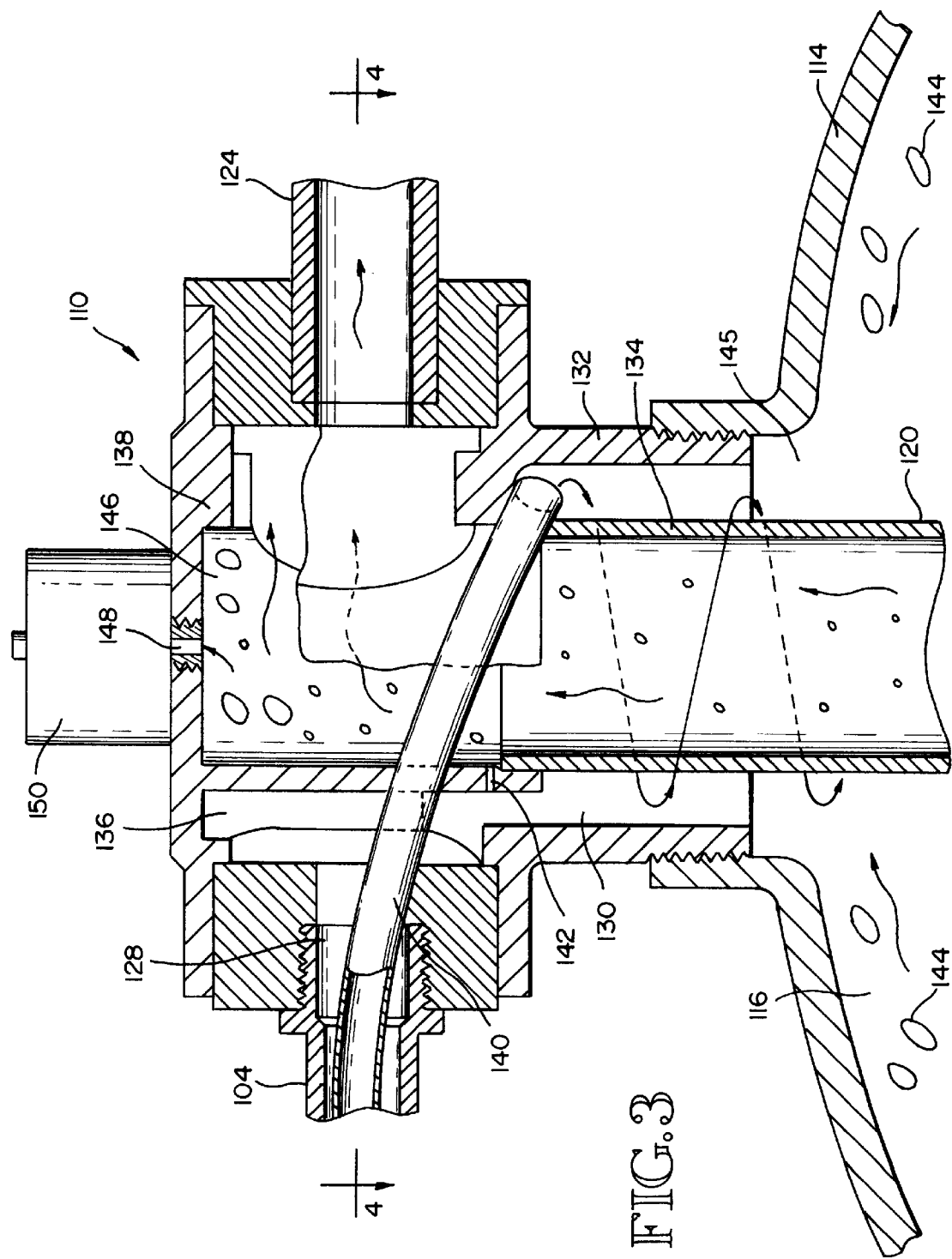
FIG. 3 is a partially cut-away cross-sectional view of a vortex chamber and degassing chamber according to the present invention.

Referring now to FIGS. 3 and 4 together, therein is shown at 110 an embodiment of the vortex housing. An inlet conduit is provided at 128 through which water is introduced. Within the housing 110 is a vortex chamber 130 that is shaped to create a swirling action. The vortex chamber 130 is an annular space formed between an outer housing wall 132 and an inner housing wall 134. To one side of the inlet port 128, there is a barrier wall 136 extending downwardly from the top wall 138. This barrier wall 136 forces the swirling water to spiral downwardly around the annular vortex chamber 130.

In preferred form, the flexible nozzle to 140 extends from the exit port of the venturi-type injector 104 into the vortex chamber 130 downwardly and toward the direction vortex rotation. This nozzle to 140 allows the user to control the amount of turbulence introduced or voided as the water enters the vortex chamber 130. The direction of water flow and rotation is shown in FIGS. 3 and 4 by arrows.

When the system is first started, water must displace atmospheric air that would ordinarily fill the system. As water is introduced into the vortex chamber 130, air trapped in an upper region is allowed to escape through a very small vent hole 142. Once the system is filled with water, the amount of pressure lost through the vent hole 142 is negligible.

As the water swirls around the vortex chamber 130, the re-circulation mixture 192 introduces microscopic entrained bubbles of ozone that mingle with the water. The exposure between the ozone and the water disinfects and purifies the water. The vortex-type turbulence does not induce the joining of bubbles. Upon entering the upper portion 116 of the tank 114, any larger bubbles 144 that may have formed migrate upwardly and are drawn into the swirling vortex discharge 145. After being forced downwardly through the contact chamber 112, the water is drawn either into the draw tube 120 or is re-circulated back through the re-circulation conduit 162. The mixture that is drawn into the draw tube 120 separates so that the bubbles of ozone expand and move upwardly, and are eventually introduced into a de-gassing or off-gassing chamber 146. The released gas is vented through an outlet port 148 to a pressure relief valve 150. The pressure relief valve 150 maintains the required back pressure in the system while allowing the previously-introduced gas to escape. The purified water from which the treatment gas has been removed then flows through an outlet port 124 for use.

In order to provide economy and diversity, it is preferred that the housing 110 that provides the vortex chamber 130 and de-gassing chamber 146 be provided with standard threads for mating to readily-available and commonly-sized tanks 114. Also, it is preferred that standard sized PVC pipe, such as 1 inch, 1¼ inch, 1½ inch or 2 inch diameter, be used for the draw tube 120. In this manner, the draw tube 120 can be cut to fit and installed on site.

In a typical purification system for use on a residential well, ¾ inch to 1 inch inlet and outlet ports are adequate. A tank diameter of 6 inches with a length of 48 to 54 inches is believed to provide at least 6 to 8 minutes of contact time between a virtual cloud of microscopic ozone bubbles and the water being treated. In use it is expected that the treatment system will operate approximately 15 minutes every six hours.

For applications in which potable drinking water is desired, such as on marine vessels and residential homes, a carbon filter may be readily installed to remove any excess ozone before the water is output for use.

In these systems, the wall-mountable configuration may be used in which a tank diameter of 6 inches with a length of 18 inches is believed to provide at least 1 to 3 minutes of contact time.

For larger applications, such as swimming pools or larger water systems, 2 inch to 3 inch inlet and outlet ports may be used. In a larger embodiment such as this, it will be necessary to use a larger diameter draw tube and de-gassing chamber, also. Larger tanks, such as 10 to 12 inches or larger in diameter, may also be required.

A wide variety of alterations and adjustments may be made to the disclosed, preferred embodiments without departing from the spirit and scope of the present invention. Accordingly, the scope of patent protection is not to be limited by the disclosed embodiments, but rather by the following claim or claims interpreted according to accepted doctrines of claim interpretation, including the doctrine of equivalents and reversal of parts.

What is claimed is:

1. An apparatus for treating liquid with a gas, comprising:

an inlet for a liquid stream;

a vortex chamber into which the liquid stream enters, the chamber creating a downward spiral flow of the liquid stream;

a contact tank having a tank inlet at an upper end and a tank outlet at a lower end, the downward spiral flow being delivered into the tank inlet to force a flow of the liquid stream downward in the tank;

a conduit being impervious to the liquid stream and having a conduit inlet and a conduit outlet, the conduit inlet operably connected to the tank outlet;

a degassing chamber operably connected to the conduit outlet, said degassing chamber having an outlet for delivery of treated liquid for use; and a re-circulation system comprising a re-circulation conduit, a gas injector system, and a pump;

wherein the re-circulation conduit operably connects a lower region of the tank with an upper region of the tank, the pump and gas injector system are operably positioned between two ends of the re-circulation conduit so that the pump draws the liquid stream from the lower region of the contact tank into the re-circulation conduit where the gas injector system entrains bubbles of a treatment gas into the liquid stream thereby creating a re-circulated stream which the pump displaces through the re-circulation conduit to the upper region of the tank.

2. The apparatus of claim 1, further comprising a detector that detects a desired flow of the liquid stream through the inlet and controls operation of the pump and gas injector system.

3. The apparatus of claim 2, wherein the detector comprises a flow control switch.

4. The apparatus of claim 2, further comprising a check valve in the inlet positioned between the detector and the vortex chamber.

5. The apparatus of claim 1, wherein the gas injector system comprises a gas generator, a supply line, and a gas injector.

6. The apparatus of claim 5, wherein the gas injector comprises a venturi-type injector.

7. The apparatus of claim 1, wherein the re-circulation system is positioned externally of the contact tank.

8. The apparatus of claim 1, wherein the vortex chamber comprises an annular space around which the liquid stream downwardly spirals.

9. The apparatus of claim 8, wherein the degassing chamber is concentrically positioned within the vortex chamber, said annular space being provided radially outwardly of the degassing chamber.

10. The apparatus of claim 9, wherein the conduit comprises a draw tube extending upwardly within the tank to the degassing chamber.

11. The apparatus of claim 10, wherein the contact tank comprises a substantially rounded bottom sloping toward the tank outlet.

12. The apparatus of claim 10, further comprising a detector that detects a desired flow of the liquid stream through the inlet and controls operation of the pump and gas injector system.

13. The apparatus of claim 10, wherein the gas injector system comprises a gas generator, a supply line, and a gas injector.

14. The apparatus of claim 8, wherein the contact tank comprises a substantially rounded top sloping upwardly toward the tank inlet.

15. The apparatus of claim 8, further comprising a vent means for removing ambient air from the system at system start-up.

16. The apparatus of claim 1, wherein the degassing chamber is positioned at least as high as the vortex chamber.

17. The apparatus of claim 16, wherein the degassing chamber includes a region of increased volume into which the liquid stream is delivered from the tank outlet, thereby providing a region of decreased pressure for facilitating removal of the treatment gas from the liquid.

18. The apparatus of claim 16, wherein the degassing chamber further comprises a gas vent for release of removed treatment gas.

19. The apparatus of claim 18, wherein the gas vent comprises a valve means for keeping liquid in the system and venting gas without significant loss of back pressure.

20. The apparatus of claim 16, wherein the conduit comprises a draw tube extending upwardly within the tank to the degassing chamber.

* * * * *